US010446862B2

(12) United States Patent
Arisetty et al.

(10) Patent No.: US 10,446,862 B2
(45) Date of Patent: Oct. 15, 2019

(54) FUEL CELL ARCHITECTURES, THERMAL SYSTEMS, AND CONTROL LOGIC FOR EFFICIENT HEATING OF FUEL CELL STACKS

(71) Applicant: GM GLOBAL TECHNOLOGY OPERATIONS LLC, Detroit, MI (US)

(72) Inventors: Srikanth Arisetty, Novi, MI (US); Aaron R. Rogahn, Davisburg, MI (US); Balasubramanian Lakshmanan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 15/589,218

(22) Filed: May 8, 2017

(65) Prior Publication Data

US 2018/0323453 A1    Nov. 8, 2018

(51) Int. Cl.

| | |
|---|---|
| *H01M 8/04* | (2016.01) |
| *B60L 3/12* | (2006.01) |
| *H01M 8/04746* | (2016.01) |
| *H01M 8/04302* | (2016.01) |
| *H01M 8/0432* | (2016.01) |
| *H01M 8/04992* | (2016.01) |
| *H01M 8/04701* | (2016.01) |
| *B60L 58/31* | (2019.01) |
| *B60L 58/34* | (2019.01) |

(52) U.S. Cl.
CPC ........... *H01M 8/04753* (2013.01); *B60L 3/12* (2013.01); *B60L 58/31* (2019.02); *B60L 58/34* (2019.02); *H01M 8/04302* (2016.02); *H01M 8/04365* (2013.01); *H01M 8/04731* (2013.01); *H01M 8/04992* (2013.01); *B60L 2240/36* (2013.01); *B60L 2240/80* (2013.01); *B60L 2270/10* (2013.01); *H01M 2250/20* (2013.01); *H01M 2250/402* (2013.01)

(58) Field of Classification Search
CPC ......... H01M 8/04753; H01M 8/04731; H01M 8/04365; H01M 8/04992; H01M 8/04302; H01M 2250/20; H01M 2250/402; B60L 58/32; B60L 3/12; B60L 2240/36
See application file for complete search history.

(56) References Cited

U.S. PATENT DOCUMENTS

| | | | | |
|---|---|---|---|---|
| 2006/0234092 | A1* | 10/2006 | Thompson | ........ H01M 8/04007 429/429 |
| 2011/0189569 | A1* | 8/2011 | Sinha | ...................... H01M 8/04 429/429 |
| 2018/0236894 | A1* | 8/2018 | Bandai | .............. H01M 8/04014 |

\* cited by examiner

*Primary Examiner* — Muhammad S Siddiquee
(74) *Attorney, Agent, or Firm* — Quinn IP Law (57) ABSTRACT

Disclosed are fuel cell architectures, thermal sub-systems, and control logic for regulating fuel cell stack temperature. A method is disclosed for regulating the temperature of a fuel cell stack. The method includes determining a pre-start temperature of the fuel cell stack, and determining, for this pre-start temperature, a target heating rate to heat the stack to a calibrated minimum operating temperature. The method then determines a hydrogen bleed percentage for the target heating rate, and executes a stack heating operation including activating the fuel cell stack and commanding a fluid control device to direct hydrogen to the cathode side at the hydrogen bleed percentage to generate waste heat. After a calibrated period of time, the method determines if an operating temperature of the stack exceeds the calibrated minimum stack operating temperature. Responsive to the operating temperature being at or above the minimum operating temperature, the stack heating operation is terminated.

14 Claims, 3 Drawing Sheets

FUEL CELL ARCHITECTURES, THERMAL SYSTEMS, AND CONTROL LOGIC FOR EFFICIENT HEATING OF FUEL CELL STACKS

INTRODUCTION

The present disclosure relates generally to fuel cell systems for converting chemical energy of gaseous hydrogen-based fuels into electricity. More specifically, aspects of this disclosure relate to thermal systems and related control algorithms for efficiently heating fuel cell stacks.

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., differential, axle, and road wheels) through a multi-speed power transmission. Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and electric vehicles, on the other hand, utilize alternative power sources, such as an electric motor-generator, to propel the vehicle and minimize reliance on an engine for power and, thus, increase overall fuel economy.

Hybrid electric and full electric vehicle powertrains take on various architectures, some of which utilize a fuel cell system to supply power for one or more electric traction motors. A fuel cell is an electro-chemical device generally composed of an anode that receives hydrogen ($H_2$), a cathode that receives oxygen ($O_2$), and an electrolyte interposed between the anode and cathode. An electrochemical reaction is induced to oxidize hydrogen molecules at the anode to generate free protons (H+), which are then passed through the electrolyte for reduction with an oxidizing agent, such as oxygen, at the cathode. In particular, hydrogen gas is catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to generate water. Electrons from the anode, however, cannot pass through the electrolyte and, thus, are redirected through a load, such as a motor or battery, before being sent to the cathode.

Fuel cell designs commonly employed in automotive applications utilize a solid polymer electrolyte membrane (PEM)—also called "proton exchange membranes" (PEM)—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to conduction of protons. The anode and cathode typically include finely dispersed catalytic particles, such as platinum (Pt), supported on carbon particles and mixed with an ionomer. The catalytic mixture is deposited on the sides of the membrane to form the anode and cathode catalytic layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

To generate the requisite electricity for powering a motor vehicle, numerous fuel cells are typically combined, in series or in parallel, into a fuel cell stack to achieve a higher output voltage and allow for stronger current draw. For example, a typical fuel cell stack for an automobile may have two hundred or more stacked fuel cells. These fuel cell stacks receive reactant gas as a cathode input, typically as a flow of ambient air or concentrated gaseous oxygen forced through the stack by a compressor. During normal operation, a quantifiable mass of the oxygen is not consumed by the stack; some of the remnant oxygen is output as cathode exhaust gas that may include water as a stack by-product. The fuel cell stack also receives hydrogen or hydrogen-rich reactant gas as an anode input that flows into the anode side of the stack. The distribution of hydrogen within the anode flow channels is typically held substantially constant for proper fuel cell stack operation. In some operational modes, supplementary hydrogen is fed into the fuel cell stack so that the anode gas is evenly distributed to achieve a calibrated stack output load. However, with this additional hydrogen input, the amount of hydrogen that "slips" to the anode's exhaust is increased, which can lead to reduced system efficiency.

Excessive fuel cell stack temperatures, both hot and cold, affect system efficiency and operational life expectancy; as such, most fuel cell systems employ a thermal sub-system to regulate the operating temperature of the fuel cell stack. For instance, a cooling fluid may be pumped through dedicated fluid flow channels in the bipolar plates of the stack to draw away excess stack heat. During normal fuel cell stack operation, pump speed may be controlled, for example, based on stack load, ambient temperature, and other factors, so that the operating temperature of the stack is maintained within an optimal temperature range, e.g., about 30-80° C. The thermal sub-system may also integrate a radiator or similar device into the cooling fluid loop to reduce the temperature of the stack-heated cooling fluid such that the cooling fluid can be cycled back through the stack for reuse. For fuel cell "cold start"—system start-up in freezing temperatures, e.g., at or below 0° C.—the cooling fluid in the coolant loop and stack is very cold; if the pump is immediately started, the cooling fluid may have a quenching effect on the fuel cell reaction that may cause a significant drop in stack output voltage and power. One approach to remediating this scenario is the incorporation of an electric heater or other dedicated heating element into the fuel cell stack. However, such devices increase design complication and add to the overall cost of the system.

SUMMARY

Disclosed herein are vehicle fuel cell architectures, fuel cell thermal control sub-systems, and related control logic for effectively and efficiently regulating the temperature of a fuel cell stack. By way of example, and not limitation, there is presented a novel control strategy to efficiently heat a fuel cell stack by maximizing waste heat with low $H_2$ slip and low cell voltage operation. In this example, an effective freeze start (e.g., ambient temperatures at or below 0 to −30° C.) may be accomplished by temporarily bleeding hydrogen to the cathode side of the stack, which reacts with $O_2$ reactant gas to produce catalytic heating. Some of the bled hydrogen gas will not react in the cathode and, thus, may be lost to cathode exhaust. Various system parameters are regulated to achieve optimal operating conditions that help to minimize hydrogen slip and maximize catalytic heating rate. For instance, a disclosed control strategy implements set points on the oxygen flow rate, percentage of hydrogen $H_2$ (% H2) bleed, and cell voltage to achieve an optimal operating point for an effective freeze start. At a given temperature, for example, a reactor model is used to calculate the flow rate of air that is sent with a given % H2 bleed and cell voltage.

By identifying limiting steps for hydrogen cathode catalytic heating (CCH), under freezing temperatures, hydrogen reaction rates can be increased with decreasing potential, increasing % H2, operating temperature and flow rates. Additionally, in instances where hydrodynamic residence time of hydrogen is slow, additional H2 slip may occur at high flow rates before it reacts. To address this issue, a control strategy is proposed where cathode flow rate is restricted to lower values but maintained above a calibrated threshold value to help ensure that cell instability is not violated. To provide an optimal heating rate from a freezing temperature, for example, cathode flow rate and cell voltage (V) and/or current density (CD) is determined with a system model or calibrated 3D table to maximize the heating rate with minimum loss of $H_2$. Lower potential may be accomplished with the assistance of an electric power booster. In a specific example, freeze start is performed by bleeding, e.g., 12% $H_2$ to the cathode side of the stack while maximizing the compressor flow of reactant gas $O_2$ feed to the cathode. Unreacted $H_2$ is diluted, for example, with bypass air so that the outlet $H_2$ concentration in the cathode exhaust is limited to approximately 4% or less. Depending on system architecture, the operational bypass flow, % H2 inlet, and current density of operation may be fixed.

Attendant benefits for at least some of the disclosed concepts include improved fuel cell system reliability, increased system heating efficiency, reduced start up time during cold/freeze starts, decreased system emissions, and reduced overall system costs. Other attendant benefits may include minimizing the impact of environmental variations and replaceable component failure by eliminating system dependence on a dedicated electrical heating deceive. Disclosed control procedures also help to increase freeze start efficiency by using less hydrogen-based fuel. At −30C, with a bleed of approximately 6-15% $H_2$ (e.g., 10% $H_2$) in the cathode, while operating at a CD of approximately 0.15 A/cm2 and reducing the flow rate from approximately 1.6 (or Stoic 10) to approximately 0.6 (Stoic 5) standard liter per minute (SLPM), for example, outlet % H2 is reduced from 5% to approximately 1.8% while concomitantly increasing fraction of waste heat to achieve effective stack heating. The term "waste heat," as used herein, can be typified as heat generated as an ancillary byproduct of a chemical reaction in a system process that is not specifically designed to generate heat.

Aspects of the present disclosure are directed to control algorithms for detecting fuel cell stack freeze start conditions, and regulating system operation to heat the stack through maximized waste heat with minimized hydrogen slip. Disclosed, for example, is a method for regulating the temperature of a fuel cell stack. The method includes, in any order and in any combination with any of the disclosed features: determining a pre-start temperature of the fuel cell stack; determining, for this pre-start temperature, a target heating rate to heat the fuel cell stack to a calibrated minimum operating temperature; determining a hydrogen bleed percentage for the determined target heating rate; executing a stack heating operation, which includes activating the fuel cell stack and commanding a fluid control device to bleed or otherwise direct hydrogen to the cathode side at the hydrogen bleed percentage such that the fuel cell stack generates waste heat; after a calibrated period of time of executing the stack heating operation (e.g., about 1 to 2 minutes), determining if an operating temperature of the fuel cell stack is at or above the calibrated minimum stack operating temperature; and, responsive to the operating temperature equaling or exceeding the calibrated minimum stack operating temperature, suspending the stack heating operation. If the operating temperature has not reached the calibrated minimum operating temperature, the method may optionally include commanding the fluid control device to bleed hydrogen to the cathode side at an increased bleed percentage to generate increased waste heat, and then determining, after another calibrated period of time, if the fuel cell stack operating temperature is at or above the calibrated minimum stack operating temperature.

The method may optionally include determining if the actual heating rate of the fuel cell stack resulting from the generated waste heat is less than the target heating rate and, if it is, commanding the fluid control device to bleed hydrogen to the cathode side at an increased bleed percentage such that the stack generates increased waste heat. After another calibrated period of time, it may be determined if the stack operating temperature now equals or exceeds the calibrated minimum stack operating temperature; responsive to a determination that the operating temperature is at or above the calibrated minimum operating temperature, the stack heating operation may be suspended. Optionally, determining if the operating temperature is at or above the calibrated minimum stack operating temperature is performed responsive to a determination that the actual heating rate is equal to or greater than the target heating rate.

Other aspects of the present disclosure are directed to motor vehicles with proton exchange membrane fuel cells (PEMFC) regulated in accordance with any of the disclosed stack heating procedures. A "motor vehicle," as used herein, may include any relevant vehicle platform, such as passenger vehicles (fuel cell hybrid, fuel cell electric, fully or partially autonomous, etc.), commercial vehicles, industrial vehicles, tracked vehicles, off-road and all-terrain vehicles (ATV), farm equipment, boats, airplanes, etc. Fuel cell systems regulated in accordance with disclosed stack heating procedures can be employed in other applications, such as portable fuel cell devices, e.g., for powering residential and commercial devices, and stationary fuel cell power plants, e.g., designed to provide a clean, reliable source of power to airports, hospitals, schools, banks, and homes. A fuel-cell powered motor vehicle is disclosed that includes a vehicle body, multiple road wheels, and a traction motor attached to the vehicle body for driving one or more of the road wheels. An in-vehicle fuel cell system, which powers the traction motor, includes a fuel cell stack with a proton-conducting membrane interposed between a cathode and an anode. A first fluid control device, which may be in the nature of an electronically controlled bleed valve, is operable to bleed or otherwise direct hydrogen flow to the anode side and/or the cathode side. Likewise, a second fluid control device, which may be in the nature of a pump or compressor, is operable to direct oxygen flow to the cathode side.

The fuel-cell powered motor vehicle also includes a vehicle controller, such as a programmable powertrain electronic control unit (ECU), for monitoring and controlling the fuel cell system. The vehicle controller is programmed to determine a pre-start temperature of the fuel cell stack, and then determine, for this pre-start temperature, a target heating rate to heat the stack to a calibrated minimum operating temperature. A hydrogen bleed percentage is determined for the target heating rate, and a stack heating operation is executed. The stack heating operation includes, for example, activating the fuel cell stack and contemporaneously commanding the first fluid control device to bleed/direct hydrogen to the cathode side at the hydrogen bleed percentage such that the chemical reaction between hydrogen and oxygen generates waste heat. After a calibrated period of time of executing the stack heating operation, the vehicle controller is programmed to determine if the operating temperature of the fuel cell stack is at or above the calibrated minimum stack operating temperature. Responsive to a determination that the operating temperature meets or exceeds the calibrated minimum operating temperature, the controller will disengage the stack heating operation.

Other aspects of the present disclosure are directed to non-transitory, computer readable media storing instructions executable by at least one of one or more processors of one or more in-vehicle electronic control units. These instructions, when executed, cause the ECU(s) to perform various operations, which may include, in any order and in any combination with any features presented in this disclosure: determining a pre-start temperature of the fuel cell stack; determining, for the pre-start temperature, a target heating rate to heat the fuel cell stack to a calibrated minimum stack operating temperature; determining a hydrogen bleed percentage for the determined target heating rate; executing a stack heating operation including activating the fuel cell stack and commanding a first fluid control device to direct hydrogen to a cathode side of the fuel cell stack at the hydrogen bleed percentage such that the fuel cell stack generates waste heat; determining, after a calibrated period of time of executing the stack heating operation, if an operating temperature of the fuel cell stack is at or above the calibrated minimum stack operating temperature; and responsive to a determination that the operating temperature is at or above the calibrated minimum stack operating temperature, disengaging the stack heating operation.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
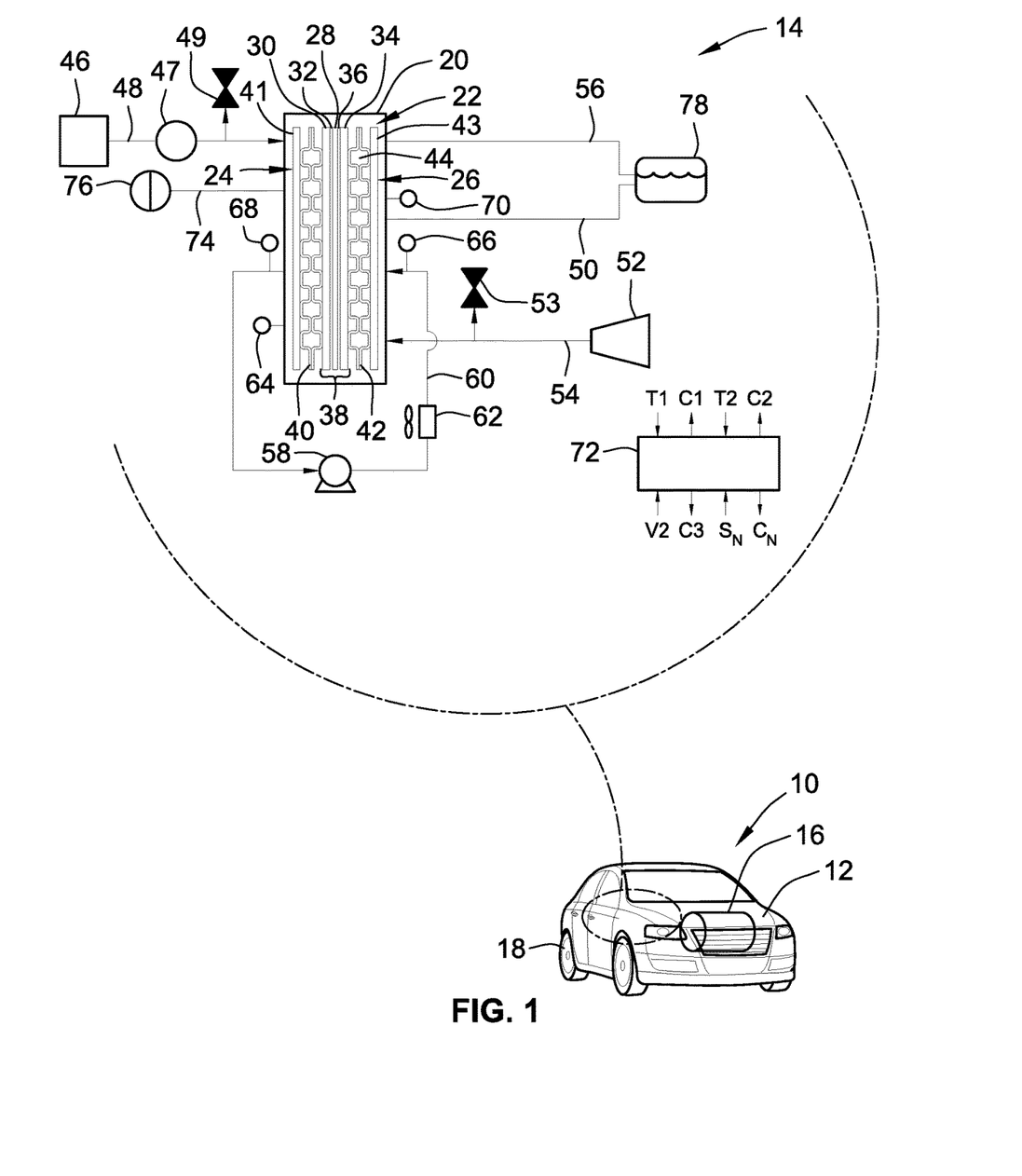
FIG. 1 is a perspective view illustration of a representative motor vehicle with an inset schematic diagram of a representative fuel cell system with fuel cell stack thermal regulation capabilities in accordance with aspects of the present disclosure.

Referring now to the drawings, wherein like reference numbers refer to like features throughout the several views, there is shown in FIG. 1 an illustration of a representative automobile, which is designated generally at 10 and portrayed herein for purposes of discussion as a four-door sedan-style passenger vehicle. Packaged within the vehicle body 12 of automobile 10 is a representative fuel cell system, designated generally at 14, for powering one or more traction motors 16 operable for driving the vehicle's road wheels 18. The illustrated automobile 10—also referred to herein as "motor vehicle" or "vehicle" for short—is merely an exemplary application with which many aspects and features of this disclosure may be practiced. In the same vein, implementation of the present concepts into a PEN/WC-type fuel cell system 14 should also be appreciated as an exemplary application of the novel concepts disclosed herein. As such, it will be understood that many aspects and features of the present disclosure may be applied to other fuel cell system architectures, utilized for other automotive and non-automotive applications, and implemented by any logically relevant type of motor vehicle. Lastly, the drawings presented herein are not necessarily to scale and are provided purely for instructional purposes. Thus, the specific and relative dimensions shown in the drawings are not to be construed as limiting.

Proton exchange membrane fuel cell system 14 of FIG. 1 is equipped with one or more fuel cell stacks 20, each of which is composed of multiple fuel cells 22 of the PEM type that are mounted, e.g., in series with, to one another. In the illustrated architecture, each fuel cell 22 is, for example, a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, an MEA 38. Only select components of the system 10 have been shown by way of example in the drawings and will be described in detail herein. Nevertheless, the fuel cell system 10 can include numerous additional and alternative features, and other well-known peripheral components, without departing from the intended scope of this disclosure.

The diffusion media layers 30 and 34 are porous constructions that provide for fluid inlet transport to and fluid exhaust transport from the MEA 38. An anode flow field plate (or "bipolar plate") 40 is provided on the anode side 24 in abutting relation to the anode diffusion media layer 30. In the same vein, a cathode flow field plate (or "bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds direct hydrogen fuel and oxidant to passages in the anode and cathode flow field plates. The MEA 38 and bipolar plate 40, 42 may be stacked together between stainless steel clamping plates 41 and 43 and monopolar end plates (not shown). These clamping plates 41, 43 may be electrically insulated from the end plates by a gasket or dielectric coating (not shown). The fuel cell system 14 may also employ anode recirculation where an anode recirculation gas is fed from an exhaust manifold through an anode recirculation line for recycling hydrogen back to the anode side 24 input so as to conserve hydrogen gas in the stack 20.

Hydrogen ($H_2$) inlet flow—be it gaseous, concentrated, entrained or otherwise—is transmitted from a hydrogen/nitrogen source 46 to the anode side 24 of the fuel cell stack 20 via a fluid injector 47 coupled to a (first) fluid intake conduit or hose 48. Anode exhaust exits the stack 20 via a (first) fluid exhaust conduit or manifold 50; exhaust manifold directs the exhaust to a collection sump 78. A central active region of the anode bipolar plate that confronts the proton-conductive membrane 28 may be fabricated with a working face having an anode flow field with serpentine flow channels for distributing hydrogen over an opposing face of the membrane 28. A compressor or pump 52 provides a cathode inlet flow, e.g., of ambient air, deionized water (DI $H_2O$) and/or concentrated gaseous oxygen ($O_2$), via a (second) fluid intake conduit or hose 54 to the cathode side 26 of the stack 20. Cathode exhaust is output from the stack 20 via a (second) fluid exhaust conduit or manifold 56. Flow control valves, flow restrictions, filters, and other known devices for regulating fluid flow can be implemented by the system 10 of FIG. 1. For example, a hydrogen bleed valve 49 bleeds or otherwise redirects hydrogen flow from the anode's fluid intake conduit 48 to the cathode inlet (e.g., via fluid intake conduit 54), as discussed in more detail below. In the same vein, an oxygen bypass valve 53 bypasses or otherwise redirects air to the one or both exhaust manifolds 50, 56 so that outlet hydrogen concentration is diluted.

Fuel cell system 14 of FIG. 1 may also include a thermal sub-system operable for controlling the temperature of the fuel cell stack 20 during preconditioning, break-in, startup, operation, and shutdown. According to the illustrated example, a cooling fluid pump 58 pumps a cooling fluid through a coolant loop 60 to the fuel cell stack 20 and into the coolant channels 44 in each cell 22. A radiator 62 fluidly coupled in the coolant loop 60 is used to maintain the cooling fluid at a desired temperature. The fuel cell system 14 is also equipped with various sensing devices that assist with monitoring stack operation, regulating stack temperature, and controlling fuel cell exhaust and recirculation. For instance, a (first) temperature sensor 66 measures, monitors or otherwise detects a temperature value of the coolant at a coolant inlet to the fuel cell stack 20, and a (second) temperature sensor 68 measures, monitors or otherwise detects a temperature value of the coolant at a coolant outlet of the stack 20. As another example, a stack temperature sensor 64 measures, monitors or otherwise detects a temperature value of the fuel cell stack 20. An electrical connector or cable 74 connects the fuel cell stack 20 to an electric power supply 76. A voltage/current sensor 70 is operable to measure, monitor or otherwise detect fuel cell voltage and/or current across the fuel cells 22 in the stack 20 during break-in operation.

Programmable electronic control unit (ECU) 72 helps to control operation of the fuel cell system 14. As an example, ECU 72 receives one or more temperature signals T1 from the first and second temperature sensors 66 and 68 that indicates the temperature of the coolant fluid entering and exiting the fuel cell stack 20; ECU 72 may responsively issue one or more command signals C1 to modulate operation of the radiator 62. This ECU 54 also receives one or more temperature signals T2 from the stack temperature sensor 64 that indicates, for example, operating and non-operating temperatures of the stack 20; ECU 72 may responsively issue one or more command signals C2 to modulate operation of the stack (to generate waste heat) and/or thermal sub-system (to circulate cooling fluid). The ECU 54 may also receive one or more fuel cell voltage signals V2 from the voltage sensor 70, and responsively issues one or more command signals C3 to modulate current and voltage flow across the fuel cell stack 20. Additional sensor signals $S_N$ may be received by, and additional control commands $C_N$ may be issued from the ECU 72, e.g., to control the fluid injector 47, the compressor/pump 52, coolant pump 58, or any other sub-system or component illustrated and/or described herein. An exemplary algorithm executable by the ECU 72 for regulating the temperature of the fuel cell stack 20 is discussed below in more detail. In FIG. 1, the arrows originating at or extending to ECU 72 are emblematic of electronic signals or other communication exchanges by which data and/or control commands are transmitted from one component to the other.

To assist with an effective freeze start of the fuel cell system 14 (e.g., in sub-zero ambient temperatures), effective an efficient stack heating may be accomplished by bleeding hydrogen from the anode's hydrogen source to the cathode side 26 of the stack 20, which reacts with inlet oxygen flow to produce catalytic heating. System operating parameters are regulated to achieve optimal conditions that minimize hydrogen slip and maximize the catalytic heating rate. One such strategy utilizes set points on the oxygen inlet flow rate, percentage of hydrogen $H_2$ (% H2) bleed, and fuel cell system voltage to identify an optimal operating point for an effective freeze start. At a given temperature, for example, a reactor model may be used to calculate a system-calibrated flow rate of air that need to be sent with a given % H2 bleed and cell voltage. This helps to increase freeze start efficiency by using less H2 fuel while generating more waste heat. With a hydrogen bleed percentage of approximately 10% H2 in the cathode, and operating at a current density (CD) of about 0.15 $A/cm^2$ while concomitantly reducing oxygen flow rate from to approximately 0.6 standard liter per minute (SLPM), hydrogen slip percentage is reduced from to approximately 50% to approximately 18% while the fraction of waste heat is increased showing effective heating.

Through system testing, it has been found that hydrogen reaction rate tends to increase with decreasing potential, increasing % H2, and increasing oxygen flow rates. Additionally, because the hydrodynamic residence time of hydrogen is relatively slow, more hydrogen slips at high flow rates before it reacts. To offset this phenomena, the cathode inlet flow rate may be restricted to operating at lower values, yet maintained above a threshold value to help ensure that cell instability is not violated. To provide an effective heating rate from a freezing ambient and/or stack temperature, the system determines a cathode flow rate and a cell voltage/current density with a model or calibrated 3D table that will maximize the heating rate with minimum loss of hydrogen. In a non-limiting, more specific example, it may be desirable to achieve a warm up rate at least about 1 c/s at a pre-start stack temperature of −30° C., which may be achieved with a CD of 0.1 $A/cm^2$ and a stack output voltage of 0.5 V with 15% $H_2$ bleed (e.g., for a 300+ cell stack with at least approximately 300 $cm^2$ of active surface area)

Figure 2:
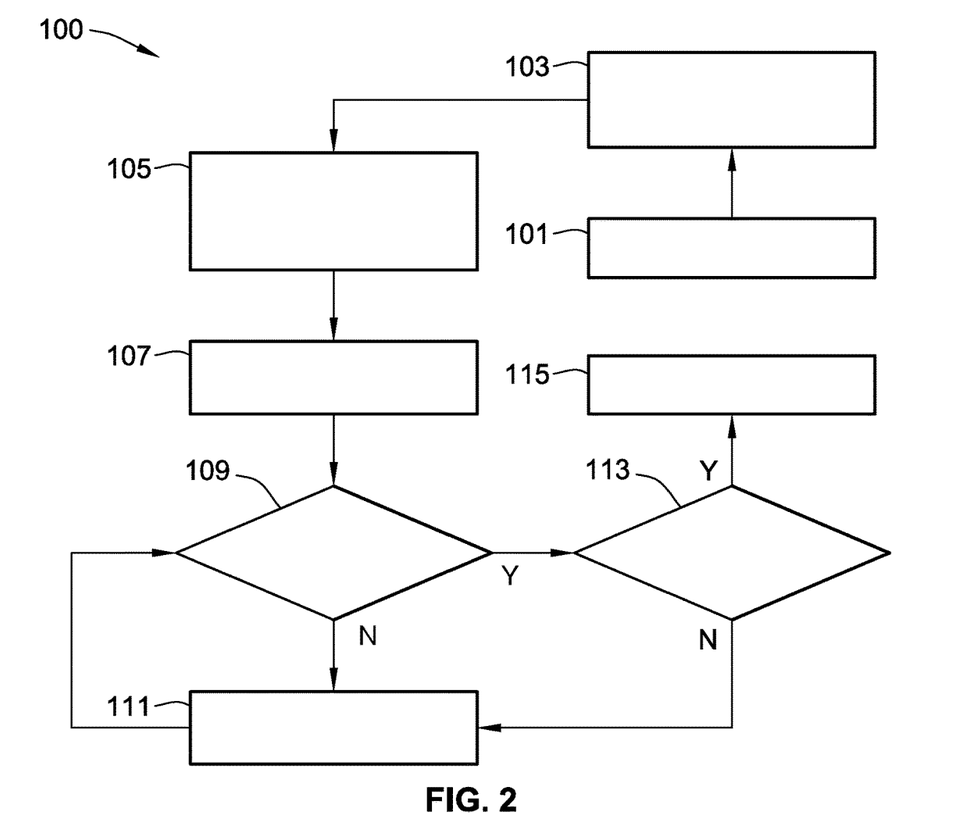
FIG. 2 is a flowchart for a fuel cell stack heating algorithm that may correspond to memory-stored instructions executed by onboard control-logic circuitry, programmable electronic control unit, or other computer-based device of a motor vehicle in accord with aspects of the disclosed concepts.

With reference now to the flow chart of FIG. 2, an improved method or control strategy for operating a fuel cell system, such as system 14 of FIG. 1, for active heating of one or more fuel cells in a stack, such as cell 22 of stack 20 in FIG. 1, for example, is generally described at 100 in accordance with aspects of the present disclosure. Some or all of the operations illustrated in FIG. 2 and described in further detail below can be representative of an algorithm that corresponds to processor-executable instructions that can be stored, for example, in main or auxiliary or remote memory, and executed, for example, by an ECU, a central processing unit (CPU), an on-board or remote control logic circuit, or other device, to perform any or all of the above and/or below described functions associated with the disclosed concepts.

Method 100 of FIG. 2 starts at terminal block 101 with determining whether or not "cold start" conditions are present, e.g., when a driver or other entity attempts to activate the fuel cell system 14. This operation may comprise detecting the ambient air temperature within which the fuel cell system 14 is located, and/or determining a pre-start (deactivated) temperature of the fuel cell stack 20. For some optional control algorithm layouts, process block 101 may be replaced with a decision block such that, if it is determined that cold start conditions are not present, the method 100 is terminated or at least suspended until such conditions are detected. Method 100 then proceeds to process block 103 with calculating, estimating or otherwise determining a target heating rate for the previously determined pre-start temperature to warm the fuel cell stack to a calibrated minimum stack operating temperature. For instance, if the pre-start stack temperature is −30° C. and the system-calibrated minimum stack operating temperature is set to 30° C., the target heating rate may be set to 1 centigrade/second with a preset one-minute heating window. Calculated target heating rates can vary, for example, depending upon the stack's starting and/or calibrated minimum operating temperatures, desired heating window, system operating limitations, application-specific restrictions, etc. One such restriction may include limitations on hydrogen gas content in the system exhaust (also referred to herein as "H2 slip" or "outlet % H2"); a threshold limit on outlet % H2 may be set to approximately 3-4% or less.

Various fuel cell system operating parameters are regulated during stack cold start to achieve stack heating conditions that minimize H2 slip while maximizing cathode catalytic heating (CCH) rate. At process block 105, for example, the ECU 72 executes memory-stored instructions to determine, e.g., through reactor model calculation, model-based control feedback, accessing stored look-up tables, etc., a hydrogen bleed percentage (also referred to herein as "% H2 bleed") to realize the desired target heating rate. Process block 105 may also include processor-executable instructions for the ECU 72 to determine other designated operating parameters that affect stack heating, such as a modified cathode-inlet oxygen flow rate for the heating operation, a heating-operation cell voltage output, an operating CD for the heating operation, and/or an operating back pressure for achieving the target heating rate. Similar to determining the target heating rate, any of the foregoing system operating parameters, singly or collectively, may be varied, for example, based on system operating limitations, application-specific restrictions, user-specified constraints, etc. By way of example, and not limitation, hydrogen bleed percentage is approximately 5 to 15% H2 or, in some embodiments, approximately 10% H2, with a cell voltage output of the fuel cell stack set to about 0.4 to 0.8 V or, in some embodiments, approximately 0.55 V or less, and a cathode-side oxygen flow rate of approximately 0.5 to 1.9 standard liters per minute (SLPM) or, in some embodiments, about 0.6 SLPM or less, operated with a fuel cell active area of 50 $cm^2$. As another more specific, non-limiting example, hydrogen bleed percentage may be set to approximately 6 to 15% H2 with the fuel cell stack operating CD set to approximately 0.05 to 0.70 $A/cm^2$ and the oxygen flow rate set to approximately 0.2 to 1.7 SLPM.

The fuel cell system control strategy 100 continues to process block 107 and executes a "cold start" stack heating operation to bring the fuel cell stack 20 up to the calibrated minimum stack operating temperature. In accord with the illustrated example, block 107 includes processor-executable instructions to activate the fuel cell stack and contemporaneously command one or more of the system's 14 fluid control devices, such as hydrogen bleed valve 49, to bleed or otherwise redirect hydrogen from the anode side 24 to the cathode side 26 at the calculated hydrogen bleed percentage. This bleed operation forces the fuel cell stack to generate amplified levels of waste heat as an accompanying byproduct of the chemical reaction that produces electricity. In effect, hydrogen is introduced directly into the cathode inlet to chemically react with oxygen in the air being introduced into the catalyst to create high-grade waste heat that can be employed for warming the stack. At the same time, ECU 72 may be further programmed, at block 107, to command one or more of the fuel cell system's fluid control devices, such as compressor/pump 52 to direct oxygen to the cathode side at the modified oxygen flow rate during the stack heating operation, e.g., to boost the CCH rate. Concurrently, one or more command signals may be sent to the fuel cell stack to generate the determined cell voltage output and operate the cathode side of the stack at the operating back pressure during the stack heating operation. In this regard, a command signal may be sent to one of the system's fluid control devices, e.g., oxygen bypass valve 53, to direct a calibrated bypass percentage of oxygen from the cathode inlet to the cathode outlet such that the bypassed oxygen dilutes hydrogen in a cathode exhaust gas flow. With this approach, the fuel cell system can be characterized, for example, by a lack of a dedicated electronic heating device for warming the stack. Air flow is set to minimize hydrogen slip.

With continuing reference to FIG. 2, the method 100 continues to decision block 109 to determine if the actual heating rate of the fuel cell stack, resulting from the waste heat generated during the stack heating operation of block 107, is approximately equal to or greater than the target heating rate calculated at block 103. If the actual heating rate of the fuel cell stack 20 is not equal to or greater than the target heating rate ($dT/dt<\Delta T_{des}$; Block 109=NO), the ECU 72 may be programmed via process block 111 to automatically respond by commanding the corresponding fluid control device(s) to bleed/direct hydrogen to the cathode side 26 of the stack 20 at an increased (or otherwise adjusted) hydrogen bleed percentage such that the fuel cell stack 20 generates increased levels of waste heat. After a calibrated window of time, e.g., sufficient to allow the increased hydrogen bleed percentage to boost the heating rate, the method 100 may loop back to decision block 109 to determine, again, if the actual heating rate of the fuel cell stack, now resulting from the higher increased waste heat, is less than the target heating rate. Blocks 109 and 111 may be executed in a continuous loop until either: (1) the target heating rate is achieved; or (2)(a) a predetermined time period has expired since the stack heating operation was first initiated (e.g., a timeout event has occurred) and/or (2)(b) if a maximum number of cycles (e.g., a default of five attempts) to increase the actual heating rate has been completed.

Responsive to a determination that the actual heating rate is approximately equal to or greater than the target heating rate ($dT/dt\geq\Delta T_{des}$; Block 109=YES), method 100 proceeds to decision block 113 to determine if the fuel cell stack operating temperature has reached the calibrated minimum stack operating temperature. In particular, after a calibrated period of time of executing the stack heating operation (e.g., about 1-2 minutes, depending on system constraints and stack start-up temp), ECU 72 detects the current operating temperature of the fuel cell stack 20 and compares it to the calibrated minimum operating temperature. If it is determined that the operating temperature is not at or above the calibrated minimum stack operating temperature, or within a preset temperature tolerance of the calibrated minimum (Block 113=NO), the method proceeds to block 111, as described above, to bleed hydrogen to the cathode side 26 of the stack 20 at an increased hydrogen bleed percentage. After a second calibrated period of time, during which hydrogen is directed to the cathode side 26 at the increased bleed percentage, the method 100 loops back to block 109 to determine if the actual heating rate of the fuel cell stack is less than the target heating rate. Optionally, method 100 may skip block 109 and loops from block 111 directly to block 113 to determine if the operating temperature of the fuel cell stack has achieved the calibrated minimum stack operating temperature. As indicated above, blocks 109, 111 and/or 113 may be executed in a restricted or unrestricted loop until a desired stack operating temperature is achieved. If the stack's current operating temperature is at or above the calibrated minimum operating temperature, ECU 72 will proceed to block 115 and temporarily suspend or otherwise terminate the stack heating operation. Thereafter, the bleed of hydrogen flow directly to the cathode side 26 is stopped such that fuel cell system 14 operation may revert to default operating parameters for normal system operation.

Figure 3:
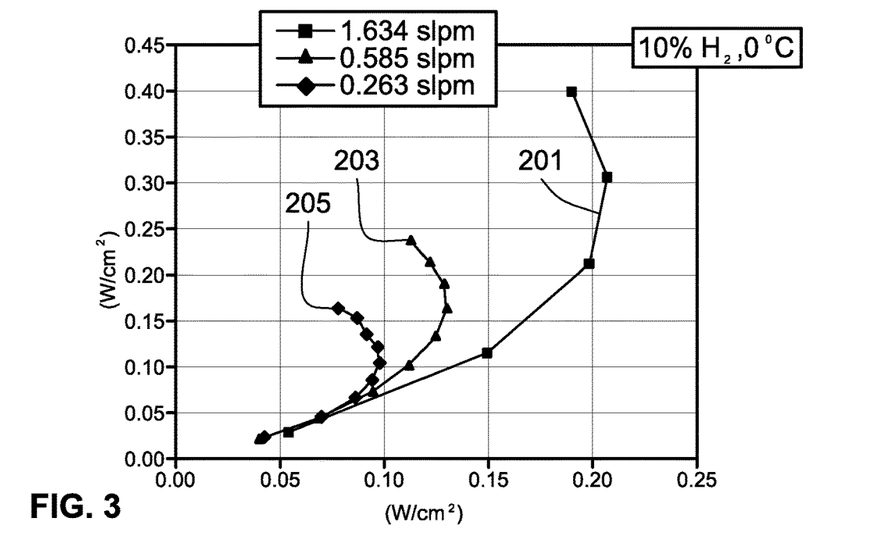
FIG. 3 is a graph illustrating fuel cell stack electric power output vs. generated waste heat at a set bleed percentage for a representative waste-heat based fuel cell stack heating procedure in accord with aspects of the present disclosure.
Figure 4:
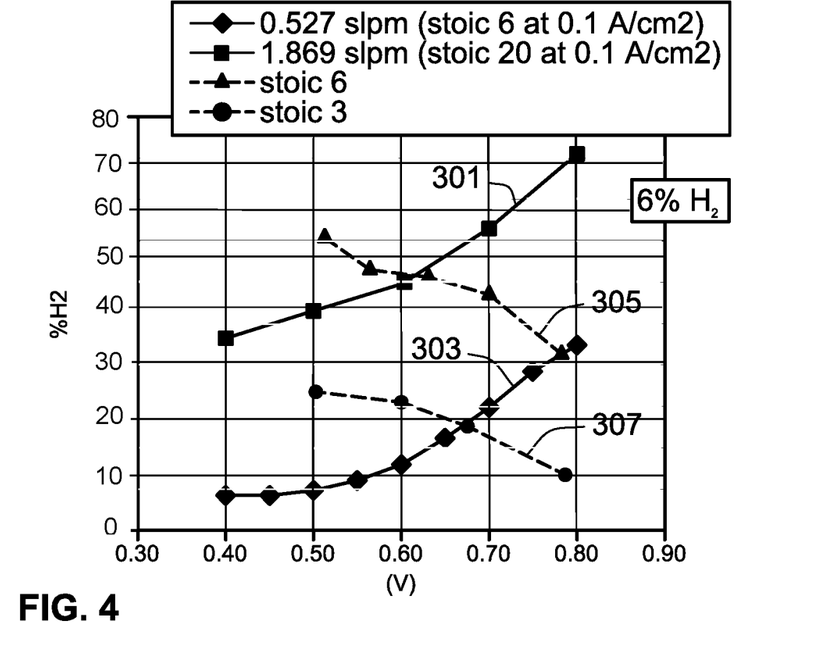
FIG. 4 is a graph illustrating fuel cell stack voltage output vs. hydrogen slip at a set bleed percentage for a representative waste-heat based fuel cell stack heating procedure in accord with aspects of the present disclosure.
Figure 5:
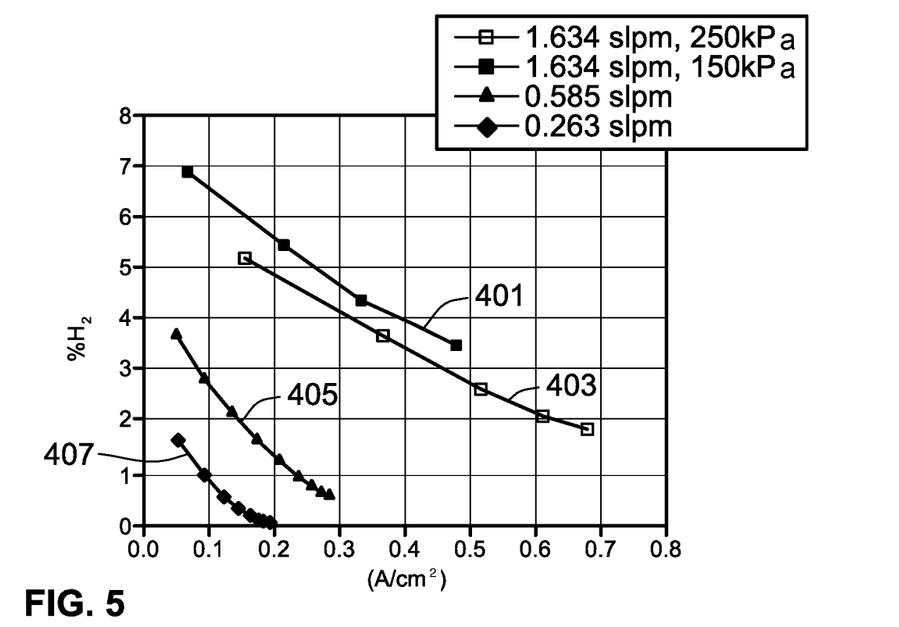
FIG. 5 is a graph illustrating stack current density vs. unreacted % hydrogen in the outlet at a set bleed percentage for a representative waste-heat based fuel cell stack heating procedure in accord with aspects of the present disclosure.

FIGS. 3-5 provide representative examples of fuel cell system operating parameters to achieve a target heating rate. FIG. 3, for example, compares fuel cell stack electric power output in Watts per centimeter squared ($W/cm^2$) on the x-axis with generated waste heat ($W/cm^2$) on the y-axis at a set bleed percentage (e.g., 10% H2 bleed) for three different oxygen flow rates: about 1.6 SLPM at 201; approximately 0.6 SLPM at 203; and about 0.3 SLPM at 205. This Figure helps to show that, to obtain waste heat efficiently for a given electric power, it may be desirable to operate at low potential or maximum electrical current or low flow rate with a given set of system operating conditions. For a given % CCH (cathode catalytic heating), maximum waste heat for warming the stack at cold start may be obtained, for instance, with a larger electric power output, restricted by maximum slip constraints at the cathode exhaust outlet (e.g., 4% H2 slip). Some architectures may optionally allow a user to set maximum allowable electric power at a given temperature that is calculated, e.g., based on Battery SOC, specific heat of the system, cabin heating, etc. Lower limits on electric power may be constrained by emissions limits on % H2 at the outlet. In the same vein, lower limits on electric power may be different with constraints on % H2 that can be supplied to the cathode inlet. With a 3% slip limit on emissions, for example, a lower limit on power request may be restricted to 0.075 $W/cm^2$ with 10% H2 bleed or 0.015 $W/cm^2$ with 12% H2 bleed or 0 $W/cm^2$ with 6% H2 bleed. An optimal operating condition may be to request 0.125 $W/cm^2$ using 10% H2 bleed at the cathode inlet.

Comparatively, FIG. 4 juxtaposes fuel cell stack voltage output (V) on the x-axis with hydrogen slip (% H2) on the y-axis at a set bleed percentage (e.g., 6% H2 bleed) for different oxygen flow rates and stoic set points: approximately 1.9 SLPM at 301; approximately 0.5 SLPM at 303; stoic 6 at 305; and stoic 3 at 307. This particular Figure helps to illustrate that the time constant for hydrogen-oxygen reaction (HOR) is lower than the residence time for hydrogen flow. In this instance, it may be desirable to restrict the heating operation to a 3% H slip limit. FIG. 5, on the other hand, compares operating current density ($A/cm^2$) on the x-axis with % H2 (in the outlet) on the y-axis at a set bleed percentage (e.g., 10% H2 bleed) for four different oxygen flow rates: approximately 1.6 SLPM (250 kPa cathode backpressure) at 401; approximately 1.6 SLPM (150 kPa cathode backpressure) at 403; approximately 0.6 SLPM at 405; and approximately 0.3 SLPM at 407. Similar to % H2 bleed to the cathode inlet, flow rate of hydrogen mixed air and back pressure of the cathode may be tuned for efficient heating and reduced emissions. It can be seen from these plots that operating at low potential or high current may help to minimize hydrogen slip and obtain more waste heat and electric power. Based on outlet emissions constraints, a lower limit may be set on % H2 bleed. It may be desirable, for at least some applications, to operate at low flow rates to maximize the waste heat for a given electric power. However, to help ensure that the fuel cell system can run at a reduced flow rate, inlet flow rate can be increased slowly so that the system can deliver a requested electric power and desired waste heat.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a other manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for regulating temperature of a fuel cell stack, the fuel cell stack including an anode side, a cathode side, and first and second fluid control devices for directing hydrogen flow and oxygen flow, respectively, to the fuel cell stack, the method comprising:
    determining a pre-start temperature of the fuel cell stack;
    determining, for the pre-start temperature, a target heating rate to heat the fuel cell stack to a calibrated minimum stack operating temperature;
    determining a hydrogen bleed percentage for the determined target heating rate;
    executing a stack heating operation including activating the fuel cell stack and commanding the first fluid control device to direct hydrogen to the cathode side at the hydrogen bleed percentage such that the fuel cell stack generates waste heat;
    determining, after a calibrated period of time of executing the stack heating operation, if an operating temperature of the fuel cell stack is at or above the calibrated minimum stack operating temperature; and
    responsive to a determination that the operating temperature is at or above the calibrated minimum stack operating temperature, suspending the stack heating operation.

2. The method of claim 1, further comprising, responsive to a determination that the operating temperature is not at or above the calibrated minimum stack operating temperature:
    commanding the first fluid control device to direct hydrogen to the cathode side at an increased hydrogen bleed percentage to generate increased waste heat; and
    determining, after a second calibrated period of time of hydrogen being directed to the cathode side at the increased hydrogen bleed percentage, if the operating temperature of the fuel cell stack is at or above the calibrated minimum stack operating temperature.

3. The method of claim 1, further comprising:
    determining if an actual heating rate of the fuel cell stack resulting from the generated waste heat is less than the target heating rate; and
    responsive to a determination that the actual heating rate is less than the target heating rate, commanding the first fluid control device to direct hydrogen to the cathode side at an increased hydrogen bleed percentage such that the fuel cell stack generates increased waste heat.

4. The method of claim 3, further comprising:
    determining, after a second calibrated period of time of hydrogen being directed to the cathode side at the increased hydrogen bleed percentage, if the operating temperature of the fuel cell stack is at or above the calibrated minimum stack operating temperature; and
    responsive to a determination that the operating temperature is at or above the calibrated minimum stack operating temperature, suspending the stack heating operation.

5. The method of claim 4, further comprising, responsive to a determination that the operating temperature is not at or above the calibrated minimum stack operating temperature:
    commanding the first fluid control device to direct hydrogen to the cathode side at a higher increased hydrogen bleed percentage to generate higher increased waste heat;
    determining if the actual heating rate of the fuel cell stack resulting from the higher increased waste heat less than the target heating rate; and determining if the operating temperature of the fuel cell stack is at or above the calibrated minimum stack operating temperature.

6. The method of claim 3, wherein determining if the operating temperature is at or above the calibrated minimum stack operating temperature is performed responsive to a determination that the actual heating rate is not less than the target heating rate.

7. The method of claim 1, further comprising:
determining a modified oxygen flow rate for the determined target heating rate; and
commanding the second fluid control device to direct oxygen to the cathode side at the modified oxygen flow rate during the stack heating operation.

8. The method of claim 1, further comprising:
determining a cell voltage output for the determined target heating rate; and
commanding the fuel cell stack to generate the determined cell voltage output during the stack heating operation.

9. The method of claim 8, wherein the hydrogen bleed percentage is approximately 5 to 15% H2 with the cell voltage output of the fuel cell stack at approximately 0.4 to 0.8 V and an oxygen flow rate to the cathode side of approximately 0.5 to 1.9 standard liters per minute.

10. The method of claim 1, further comprising:
determining an operating current density (CD) for the determined target heating rate; and
commanding the fuel cell stack to operate at the determined operating CD during the stack heating operation.

11. The method of claim 10, wherein the hydrogen bleed percentage is approximately 6 to 15% H2 with the operating CD of the fuel cell stack at approximately 0.05 to 0.70 $A/cm^2$ and an oxygen flow rate to the cathode side of approximately 0.2 to 1.7 standard liters per minute.

12. The method of claim 1, further comprising:
determining an operating back pressure for the determined target heating rate; and
commanding the cathode side of the fuel cell stack to operate at the operating back pressure during the stack heating operation.

13. The method of claim 1, wherein determining the hydrogen bleed percentage is based, at least in part, on a maximum allowable hydrogen slip percentage.

14. The method of claim 1, further comprising commanding the second fluid control device to direct a calibrated bypass percentage of oxygen from an inlet to an outlet of the cathode side such that the bypassed oxygen dilutes hydrogen in a cathode exhaust gas flow.

* * * * *